(No Model.)

E. BUSSEY.
STOVE GRATE.

No. 264,858. Patented Sept. 26, 1882.

Witnesses:

Inventor:

UNITED STATES PATENT OFFICE.

ESEK BUSSEY, OF TROY, NEW YORK.

STOVE-GRATE.

SPECIFICATION forming part of Letters Patent No. 264,858, dated September 26, 1882.

Application filed July 5, 1882. (No model.)

*To all whom it may concern:*

Be it known that I, ESEK BUSSEY, of the city of Troy, county of Rensselaer, and State of New York, have invented a new and useful Improvement in Stove-Grates, of which the following is a specification.

My invention relates to that class of devices known as "duplex grates," which have heretofore been patented; and it consists in an improvement thereon.

My invention applies to a divided grate, each half of which is hung upon trunnions and has attached at one end the usual fan-shaped articulating gearing, so constructed that by turning one portion of the grate upon its trunnions an equal movement is given to both parts, whereby they move toward or away from a common center, thereby accomplishing its purpose of cutting off the ashes from the lower part of the fire and dropping them into the ash-pit beneath, at the same time forming a firm bed under the fire and preventing any further disturbance of the same, the whole being placed at the bottom of a fire-box that is vertically grated at its front; and my invention consists, as will hereinafter be more fully set forth, of an improvement upon such grates and the manner of working the same, in that there are added to the front half of the grate teeth corresponding in size to the slots of the grated front of the fire-box, and so located that when the two parts of the grate are operated to cut off the ashes from the lower part of the fire the teeth on the front half of the grate move upwardly and through the slots in the front of the fire-box, thereby removing the ashes or other refuse substance that may have collected against the inside of the front of the fire-box.

In the accompanying drawings, forming a part of this specification, there are two figures illustrating my invention, and in both of which the same designation of parts by letter reference is used.

Figure 1:
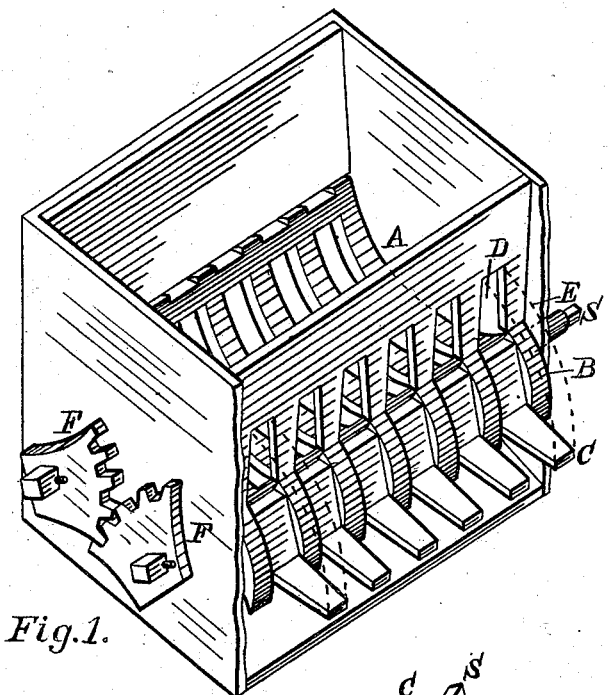

Figure 1 represents in perspective the grate in its normal position in the fire-box, A being the fire-box; B, the front half of the grate; C, the teeth, adjusted to the front half of the grate; D', the slots in the grated front of the fire-box, and F F the fan-shaped articulating gearing placed at the ends of the shafts of the two parts of the grate.

Figure 2:
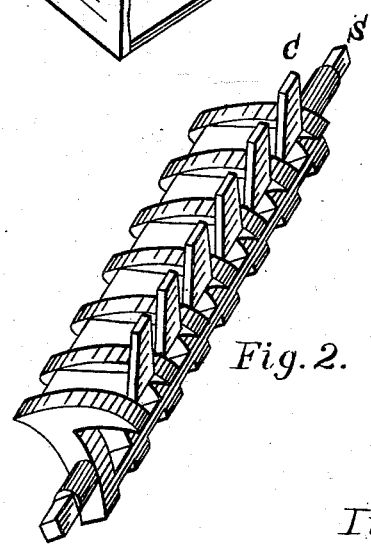

Fig. 2 represents in perspective the front half of the grate, C being the teeth adjusted thereto, and S the shaft upon which that portion of the grate rotates.

Equal movement being given to the two parts of the grate by turning the shaft S of the front half of the grate, and the grate being so turned as to cut off the ashes from beneath the fire and drop them into the ash-pit, the teeth C of the front half of the grate move upwardly while this is being done on the dotted line E and through the slots D in the grated front of the fire-box, thereby removing the ashes or such other refuse as may have collected against the inside of the front of the fire-box and keeping the front of the fire bright bright and clear.

Having thus described my invention, what I claim, and desire to secure by Letters Patent, is—

Teeth constructed upon the front half of a duplex grate, and so arranged that when the grate is operated to cut off the ashes at the bottom of the fire and to drop them into the ash-pit beneath they (the teeth) shall be carried upwardly by the same movement and through the slots in the grated front of the fire-box, substantially as and for the purposes hereinbefore described and set forth.

Signed at Troy, New York, this 29th day of May, 1882.

ESEK BUSSEY.

Witnesses:
 CHAS. M. AUSTIN,
 JNO. W. RORABACK.